(12) United States Patent  
Maydew

(10) Patent No.: US 6,554,734 B1  
(45) Date of Patent: Apr. 29, 2003

(54) GEARED ROTARY ACTUATOR

(75) Inventor: Mark Maydew, Coventry (GB)

(73) Assignee: Coventry University, Conventry (GB)

( * ) Notice: Subject to any disclaimer, the term of this patent is extended or adjusted under 35 U.S.C. 154(b) by 0 days.

(21) Appl. No.: 09/831,127

(22) PCT Filed: Nov. 11, 1999

(86) PCT No.: PCT/GB99/03769

§ 371 (c)(1),
(2), (4) Date: Jun. 16, 2001

(87) PCT Pub. No.: WO00/29286

PCT Pub. Date: May 25, 2000

(30) Foreign Application Priority Data

Dec. 11, 1998  (GB) ............................................... 9824740
Sep. 6, 1999  (GB) ............................................... 9913292

(51) Int. Cl.$^7$ ............................................... F16H 48/06
(52) U.S. Cl. .................................................... 475/248
(58) Field of Search ........................ 475/248; 244/75 R, 244/231

(56) References Cited

U.S. PATENT DOCUMENTS

| 4,173,906 | A | | 11/1979 | Altenbokum et al. ......... 74/410 |
| 4,260,045 | A | | 4/1981 | Hack ......................... 192/8 R |
| 4,721,016 | A | * | 1/1988 | Burandt |
| 4,751,855 | A | * | 6/1988 | Hudson et al. |
| 4,768,400 | A | * | 9/1988 | McKay |
| 4,932,613 | A | * | 6/1990 | Tiedemann ................. 244/213 |
| 4,932,929 | A | * | 6/1990 | Capewell .................... 475/174 |
| 4,943,267 | A | * | 7/1990 | Sugden .......................... 475/6 |
| 4,979,700 | A | * | 12/1990 | Tiedemann ............... 244/75 R |
| 5,120,285 | A | | 6/1992 | Grimm ....................... 475/342 |
| 5,518,466 | A | * | 5/1996 | Tiedemann ................. 475/342 |

FOREIGN PATENT DOCUMENTS

FR  2 372 999  6/1978

* cited by examiner

*Primary Examiner*—Dirk Wright
(74) *Attorney, Agent, or Firm*—Oppenheimer Wolff & Donnelly LLP

(57) ABSTRACT

A geared rotary actuator has a differential gear unit having a drive input and first and second outputs, an output driven member for connection to an external member to be driven by the actuator and first and second drive paths (200, 300) coupling the first and second outputs of the differential gear unit to the output driven member. Under normal conditions, drive is transmitted from the input drive to the output driven member via the differential gear unit (100) and the first drive path (200). However, if the first drive path (200) jams, drive is transmitted to the output driven member via the differential gear unit (100) and the second drive path (300). If the differential gear unit (100) jams, drive is transmitted to the output member (36) via the differential gear unit (100) and both the first and second drive paths. The gear ratio between the drive input and the output driven member remains substantially constant.

10 Claims, 4 Drawing Sheets

GEARED ROTARY ACTUATOR

The present invention relates to a geared rotary actuator.

Geared rotary actuators are used in, for example, aerospace applications where they may be used in driving aircraft control surfaces, bay doors and the like.

The present invention seeks to provide an improved actuator.

Accordingly, the present invention provides a geared rotary actuator having:

a differential gear unit having a drive input and first and second outputs;

an output driven member for connection to an external member to be driven by the actuator;

and first and second drive paths coupling said first and second outputs of the differential gear unit to said output driven member;

wherein:

the arrangement is such that under normal conditions drive is transmitted from the input drive to the output driven member via the differential unit and the first drive path;

in response to jamming or binding of said first drive path drive is transmitted to said output driven member by way of said differential unit and said second drive path;

and in response to jamming or binding of said differential unit drive is transmitted to said output member via said differential unit and both said first and second drive paths;

the arrangement being further such that the gear ratio between said drive input and said output driven member remains substantially the same.

In a preferred form of the invention the second drive path has an output carrier member which carries the whole of the first drive path such that in response to jamming of said first path the whole of the primary path is caused to rotate on block thereby to transmit drive to the output driven member.

Advantageously, each of the first and second drive paths include a balanced planetary configuration to reduce the tendency of the planets to skew under applied loading.

The present invention is further described here and after by way of example, with reference to the company drawings, in which.

Figure 3:
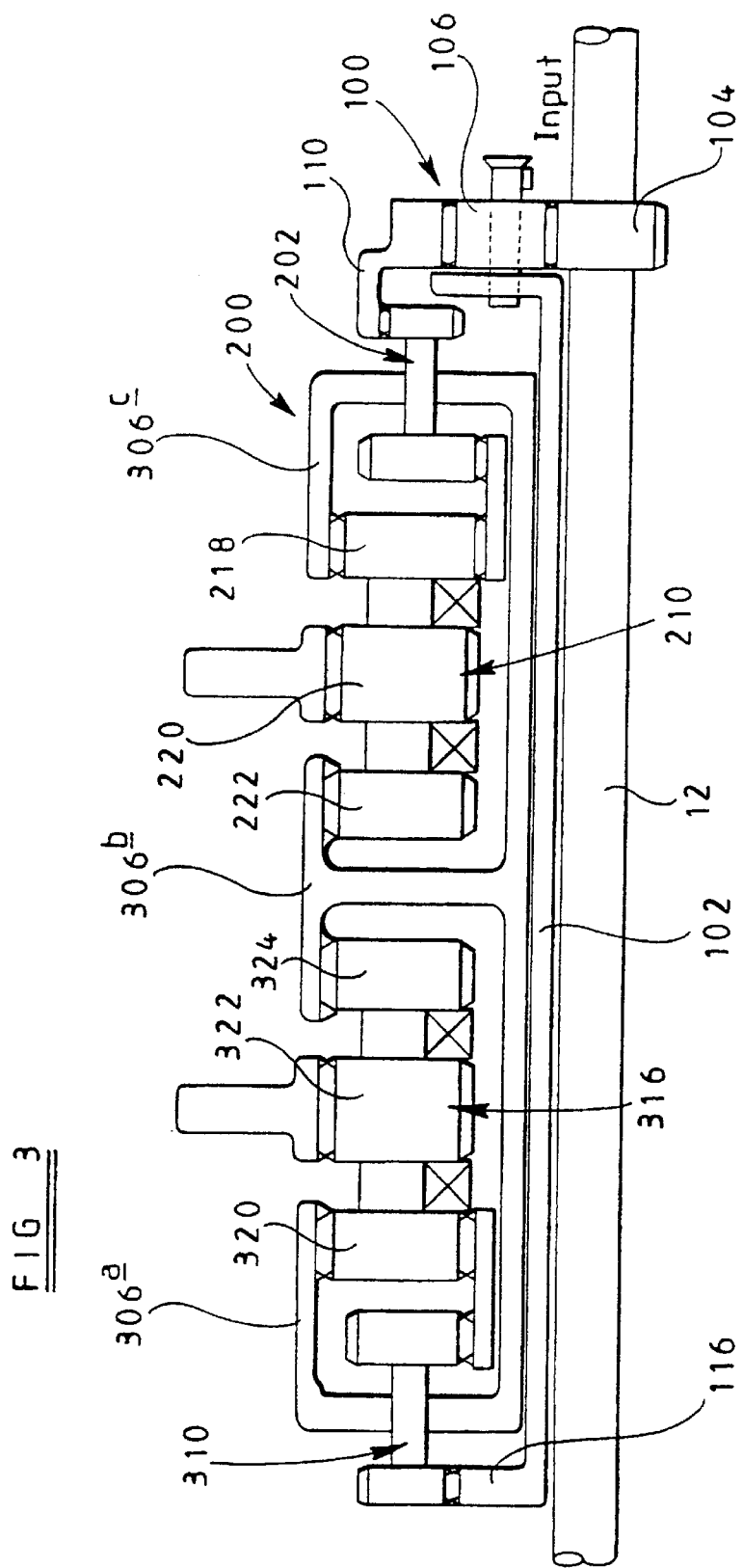
FIG. 3 is a simplified, diagrammatic view, similar to that of FIG. 2 of the actuator of FIG. 1.

Referring to the drawings, these show a preferred form of geared rotary actuator 10 which has a drive shaft 12 coupled to an output member 36 by way of an input differential gear unit 100 and two drive paths, a primary drive path 200 and a secondary drive path 300, which are illustrated in simple form in FIG. 3. The two drive paths are compound planetary epicyclic gearing, each of which is driven by an output of the input differential gear unit 100. The first drive path is the main or normal drive path through which drive is transmitted from the drive shaft 12 to the output member 36.

However, if this drive path becomes jammed, drive is transmitted to the output member 36 via the secondary drive path 300. The secondary drive path has an output carrier 302 which carries the whole of the primary path and causes it to rotate en bloc. Ratios of the input differential gear unit 100 and the individual drive paths are selected such that in the event of binding or jamming, the output member 36 continues to rotate at substantially the same speed relative to the input. This occurs regardless of the drive path taken within the actuator. If the input differential gear unit 100 itself becomes jammed the input drive is passed to both the primary and secondary drive paths which are summed such that the final ratio between the input and output of the actuator is substantially unchanged. As a result, the output member 36 is driven at substantially the same speed relative to the input drive.

The preferred form of the actuator 10 is now described below in more detail.

The drive shaft 12 is mounted for rotation by bearings 14, 16 which are supported on sleeves 18, 20 splined to the drive shaft 12 adjacent respective end regions 22, 24. The end region 22 is splined for connection to a drive source whilst the end region 24 is also splined for connection to a further actuator or the like. It will be appreciated that the splined end region 24 may be dispensed with.

The drive shaft 12 is supported by the bearings 14, 16 in respective end plates 26, 28 of the actuator.

The end plates 26, 28 are generally circular and the end plate 26 carries a cylindrical extension 30 which extends toward the end plate 28. Supported between the end plate 28 and the cylindrical extension 30 is an earth or reaction member 32, the carrier member 302 and the output or drive member 36. The reaction member 32 is generally cylindrical and carries a foot or support 38 by means of which it may be secured to prevent its rotation relative to the end plate extension 30. The output or drive member 36 is also cylindrical and carries a foot or extension 40 for connection to an external driven member. The reaction member 32 and the output member 36 are in the form of ring gears having teeth formed on their radially inner surfaces.

The carrier 302 has a radially inner sleeve 304 which coaxially surrounds a central portion of the drive shaft 12 and is spaced therefrom by an intervening tubular sleeve 102 of the differential unit 100. The drive shaft 12, sleeve 102 and sleeve 304 are coaxial and mounted for relative axial rotation.

The carrier 302 has a radially outer cylindrical wall 306 formed by three axially spaced cylindrical portions 306a, 306b and 306c. These wall portions are axially spaced from one another with the cylindrical wall of the reaction member 32 lying between the carrier wall portions 306a and 306b and the output cylindrical member 36 lying between the carrier walls 306b and 306c. The arrangement is such that the end plate extension 30, the carrier wall portions 306a, 306b, 306c, the reaction member 32 and the output member 36 all form a generally cylindrical unit whose radially outer surface effectively forms a cylindrical housing of the actuator 10.

The members 32, 36 and the wall portions 306a, 306b and 306c all have a common axis of rotation with the drive shaft 12 and the sleeve 102. The members 32 and 36 are rotatable relative to one another and to the wall portions 306a, 306b and 306c as is explained further below.

The wall portion 306b is formed integrally with the sleeve 304 whilst the wall portions 306a and 306c are formed by cylindrical members splined to respective ends of the sleeve 304. This is to facilitate assembly.

The actuator input differential unit 100 comprises a coaxial gear wheel 104 formed on the drive shaft 12 adjacent the end plate 26. The gear wheel 104 engages with a number of planetary wheels 106 which are preferably equi-angularly spaced about the axis of the drive shaft 12. Ideally there are three planetary gears 106 and these are supported on respective radial extensions 108 on the sleeve 102. The gears 104 and 106 of the differential gear unit 100 reduce the input drive speed by a preselected ratio.

The primary drive path 200 is described first below.

As is mentioned earlier, one output of the input differential gear unit 100 transmits drive from the drive shaft 12 to the primary drive path 200 of the actuator 10.

The planetary gears 106 of the differential unit 100 at the drive end of the drive shaft 12 engage a reduction gear 110. The reduction gear 110 is formed by inner and outer rings 112, 114 which are rigidly connected and which extend in opposite axial directions. The outer ring 114 has inwardly facing gear teeth which engage the planetary gears 106. The inner ring 112 has outwardly facing gear teeth which engage an number of planetary gear units 202. Each gear unit 202 has an outer and inner gear wheel 204, 206 rigidly mounted on a common shaft 208 for rotation together. The outer gear wheels 204 engage the inner ring 112 of the reduction gear 110.

The inner gear wheel 206 of each gear unit 202 is coupled to several further planetary gear units 210 by way of a reduction gear 212.

The reduction gear 212 is formed by inner and outer sleeves 214, 216 which are rigidly interconnected and which extend in opposite axial directions in a similar manner to the reduction gear 110. The inner sleeve 214 is coaxially mounted on the carrier sleeve 304 for relative rotation and carries radially outer gear teeth for meshing with the gear units 210. The outer sleeve 216 has radially inwardly directed teeth for meshing with the gear wheels 206 of the planetary gear units 202.

The form of actuator 10 illustrated in the drawings has six planetary gear units 210 meshing with the gear wheel 214. Although the number of planetary gear units 210 can be varied, the units are preferably equi-angularly spaced about the drive shaft 12. Advantageously, more than six planetary gear units 210 can be included and, ideally, between seven and nine would be provided.

Each gear unit 210 consists of three gear wheels 218, 220 and 222 rigidly secured to or integral with a common shaft 224. The three gear wheels 218, 220 and 222 are axially spaced apart by lands or reduced diameter portions 226 of the shaft.

A balanced planet configuration is used here to reduce the tendency of the gear units 210 to skew under the applied loading. This entails the use of three planet/annulus gear meshes for the primary (and the secondary) drive path. Ideally the end gear wheels 218, 222 are identical or nearly identical so that the forces thereon are theoretically balanced, causing minimal tendency for skewing of the gear units 210 about their longitudinal axes.

The gear units 210 are supported on two support rings 50, 52 which are mounted coaxially with but radially spaced from the carrier sleeve 304. The support rings 50 loosely engage the respective lands 226.

The gear wheels 218 and 222 of each gear unit 210 mesh with gear teeth on the radially inner surfaces of the carrier wall portions 306b & 306c. The gear wheel 220 meshes with teeth on the radially inner surface of the output member 36. The gear wheel 218, in addition, meshes with the gear wheel 214.

Figure 1:
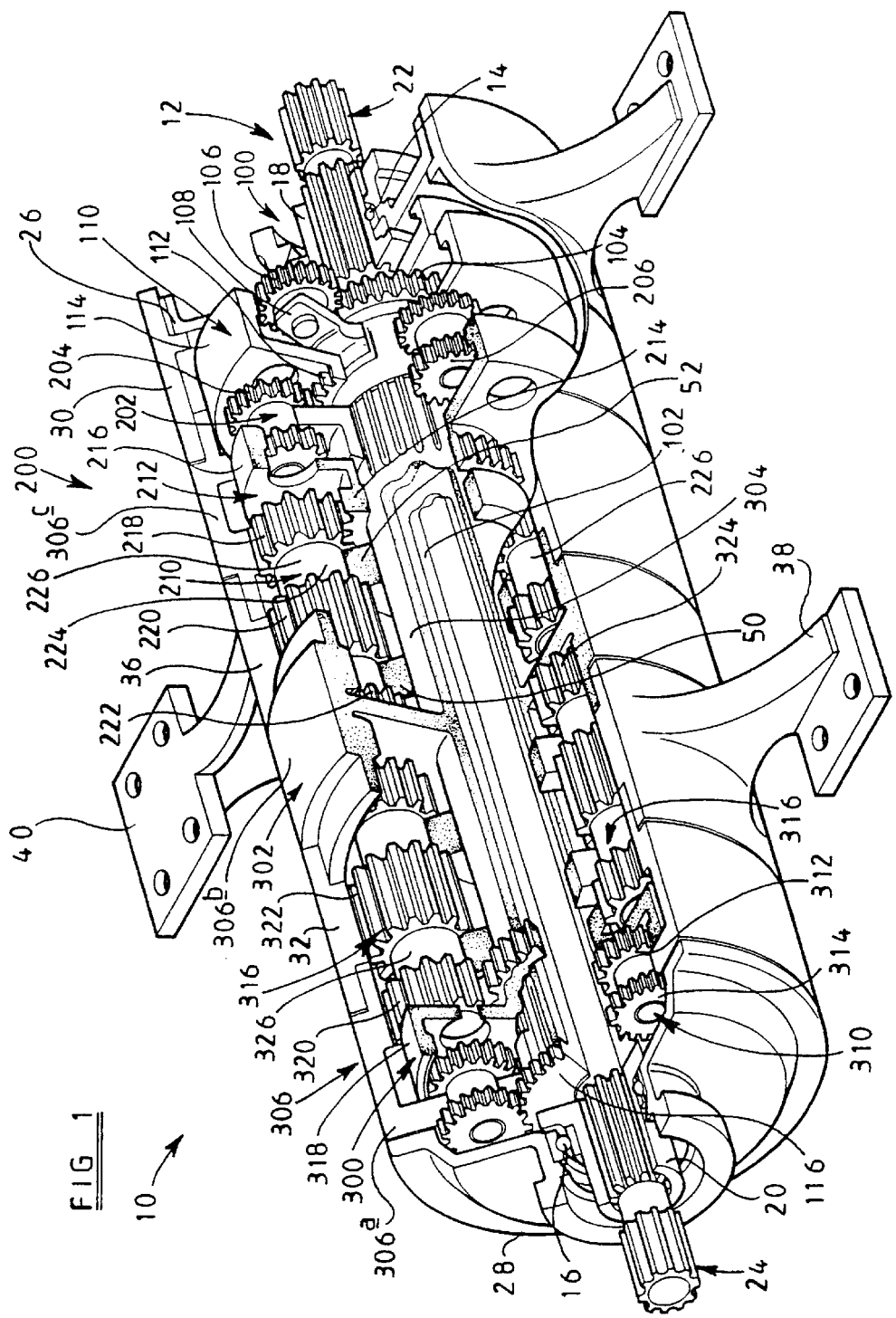
FIG. 1 is a perspective view, past section, of a preferred form of actuator according to the present inventions.
Figure 2:
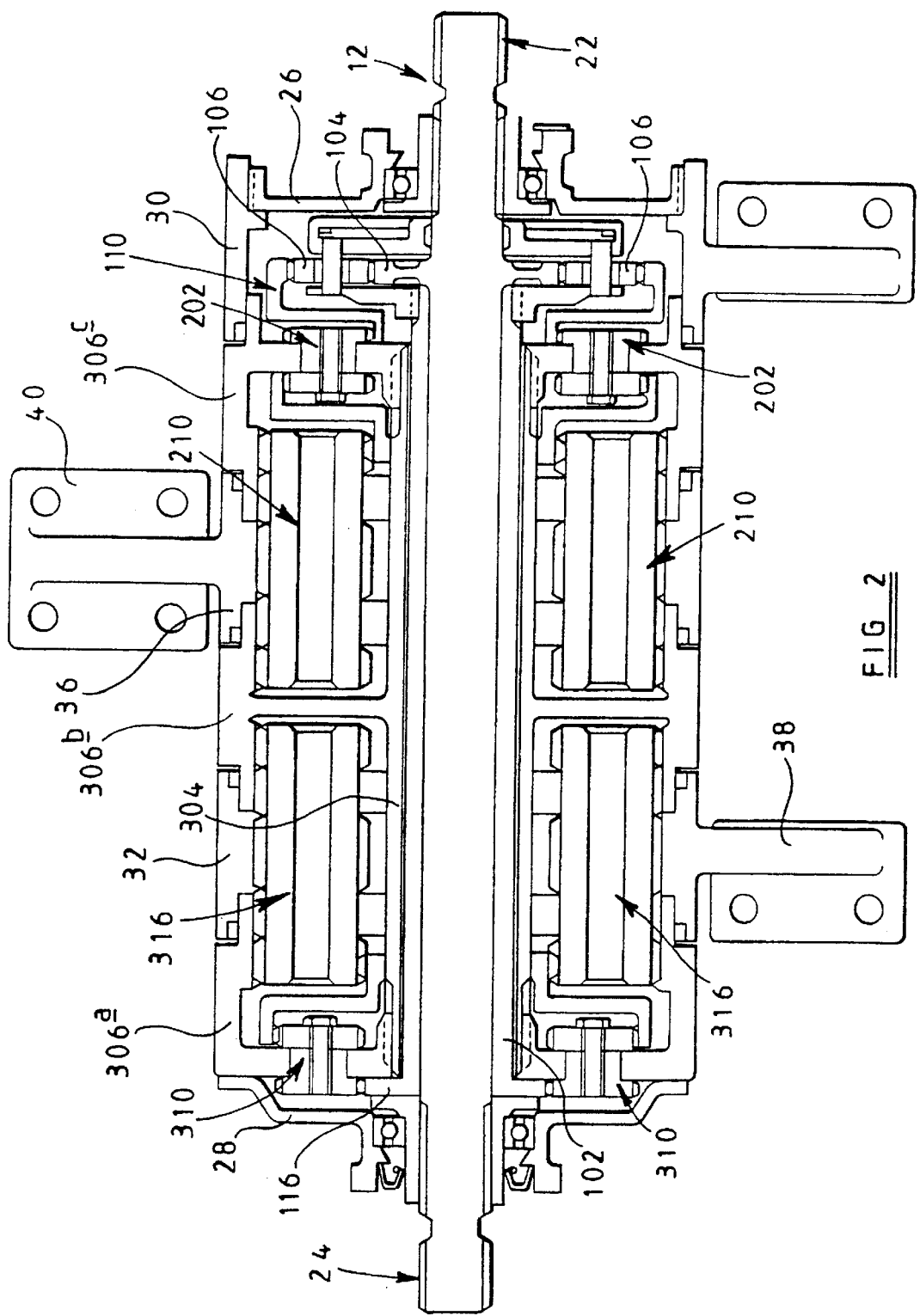
FIG. 2 is a part sectional view along the longitudinal axis of the actuator of FIG. 1.

As can be seen particularly from FIG. 2, the support rings 50 assist in maintaining the gear wheels 218 and 220 in engagement with the carrier wall portion 306b and the output member 36 whilst maintaining a suitable radial spacing of the gear unit 210 from the carrier sleeve 304.

Referring now to the secondary drive path 300, the opposite end of the sleeve 102 carries an integral gear 116 forming the second output of the input differential gear unit 100. The gear 116 meshes with a number of planetary gear units 310. The gear units 310 are preferably identical to the gear units 202 but need not be identical. Each gear unit has an inner gear wheel 312 and an outer gear wheel 314. The gear wheel 116 engages with the outer gear wheel 314 of each gear unit whilst each inner gear wheel 312 engages with several further planetary gear units 316 by way of a reduction gear.

The gear units 316 are shown identical to the gear units 210 although this is not necessarily the case. Each gear unit 316 has three gear wheels 320, 322 and 324 rigidly mounted on or integral with a common shaft 326 with the gear wheel 324 meshing with gear teeth on a radially inner wall of the wall portion 306b and the gear wheel 322 meshing with gear teeth on a radially inner wall of the reaction member 32. The gear wheel 320 of each unit 316 is coupled to the gear wheels 312 in the same manner as the gear wheels 218 are coupled to the gear wheels 206, by way of a reduction gear 318 which is similar to or identical with the reduction gear 216.

The gear units 316 are supported by support rings 50 in the same manner as the gear units 210.

As will be appreciated from the above description, in the main drive path the drive is transmitted from the drive shaft 12 to the first output of the differential unit 100 through the planetary gear wheels 106 and the gear member 110, and then through the planetary gear units 202 and the planetary gear units 210 to the output member 36.

Under normal operating conditions drive from the drive shaft 12 is transmitted along this drive path to the output member 36.

Drive from the drive shaft 12 to the output member 36 along the secondary drive path is transmitted to the second output of the differential unit 100 via the sleeve 102, the gear wheel 116 and then through the gear unit 310 reduction gear 318, gear wheel 320, the carrier 306 and the gear units 210 to the output member 36.

The operation of the actuator is now described below particularly with reference to FIGS. 4 to 6.

As is mentioned above, under normal operating conditions drive is transmitted from the drive shaft 12 to the output member 36 via the main drive path. If, however, this main drive path becomes jammed, for example as a result of one or more teeth being broken off from one of the gear wheels and causing any of the gear wheels in this path to lock, drive is transmitted to the output member from the drive shaft 12 along the secondary drive path.

It will also be advisable to include a shear neck device, or similar arrangement (not shown), to ensure that drive is through the primary drive path unless jamming of the right hand or primary drive path should occur, in which case drive is diverted to the secondary drive path. However it may be necessary for the secondary drive path to be checked as functional using test equipment. For this purpose a brake or brakes may be used for operation to check the drive paths are functional.

If the differential gear jams such that the gear ratio across the differential is 1:1 as opposed to the normal reduction gear ratio then drive from the drive shaft 12 is transmitted along both the primary and secondary drive paths to the output member 36.

Each compound planetary epicyclic gearing of the actuator primary and secondary drive paths has a substantially different ratio to account for the differing ratios of the input differential along each particular drive path. These are selected along with the input differential and other gears to give a substantially constant ratio between input and output regardless of the drive path taken within the actuator.

The above will be explained in more detail. A simple differential gear has two outputs. If one output of the differential gear is "earthed" and the other is coupled to a reduction gearbox with an output, driven member, if the reduction gearbox or the differential jams then drive to the output member is lost. In the illustrated embodiment of the present invention, under normal operating conditions the second output of the differential gear is earthed by way of the secondary drive path. Thus, as is simply illustrated in FIG. 4, a clockwise rotation of the drive shaft will produce an anti-clockwise output at a reduced speed according to the differential gear ratio. If we assume that this differential gear ratio is, for example, 3:1 then the reverse drive output of the differential is represented as −3:1. This is applied to the output member 36 along the main drive path to provide an output having a clockwise direction of rotation. If the gear ratio along the main drive path is chosen at, for example, 40:1 then the transform from the beginning to the end of the main drive path is represented as −40:1. The gear ratio from the input to output rotational speed of the output member 36 is given by the equation:

$$\omega_{out} = \omega_{in}(-1/3)(-1/40) \text{ rpm}$$

where: $\omega_{out}$ is the output member speed, and
$\omega_{in}$ is the input drive speed
Assuming for example, $\omega_{in}$ = 1000 rpm
then $\omega_{out}$ = 25/3 rpm If, however, the main drive path jams then drive to the output member 36 is transmitted along the secondary drive path to the output member 36. Thus, the output drive from the differential is in the same direction (clockwise) as the drive shaft 12. However, the differential ratio is dependent on the drive path taken and the arrangement of the feedback path along the jammed main drive path to the differential affects the gear ratio of the differential in this mode. Since drive to the output member along the secondary drive path will be via the gear units 316, the carrier 306 and the gear units 210, some drive will be transmitted via the gear units 202 back to the differential gear unit 100 to influence the differential gear ratio.

The input drive and output along the secondary drive path are both in the same direction as the drive to the drive shaft 12 and if we assume that the feedback to the differential gear results in a differential ratio of, say, 4:1 then the arrangement of gears along the secondary drive path are chosen such that the gear ratio along the secondary drive path is 30:1. Thus, the rotational speed of the output member 36 is given by the equation:

$$\omega_{out} = \omega_{in}(1/4)(1/30)$$

$$= 25/3 \text{ rpm}$$

Because the output carrier 306 carries the whole of the primary drive path the latter is caused to rotate en bloc. This causes the normal output of the differential gear unitl 100 to be "back-driven" thus applying a rotation at the differential which affects the differential gear ratio between input and output. This needs to be accounted for in the selection of the gear tooth numbers of the reduction gears so that the requirement for a substantially constant ratio between the input and the output of the actuator are met.

Figure 6:
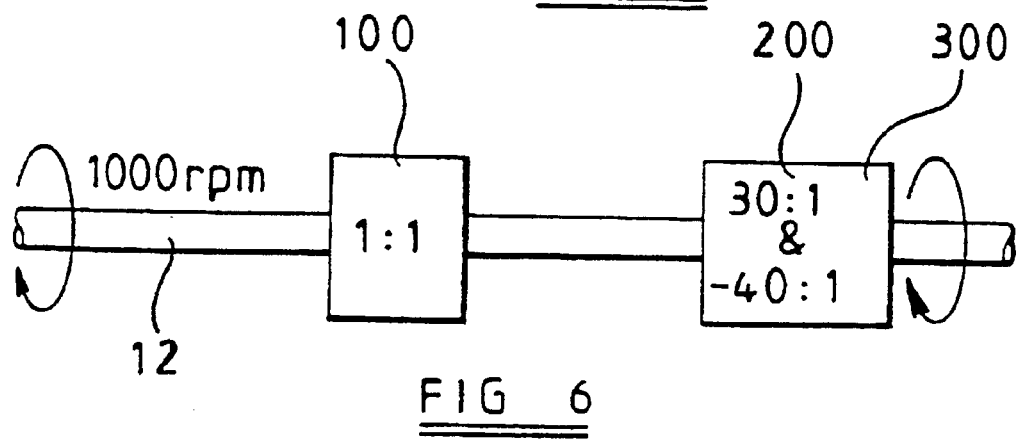

Looking now at FIG. 6, if the differential itself jams then the gear ratio across the differential is 1:1 with the output drive in the same direction as the input drive. However, in this case drive is transmitted to the output member 36 along both the main and secondary drive paths and the ratio between the input and output of the actuator is maintained by selection of the gear ratios of the main and secondary drive paths to be opposite in terms of direction and sufficiently different in terms of absolute ratio. The rotational speed of the output member 36 is therefore given by the equation:

$$\omega_{out} = \omega_{in}(1/1)(1/30 - 1/40)$$

$$= 25/3 \text{ rpm}$$

As can be seen, the result is that regardless of whether a jam occurs along the main drive path or in the differential, the same gear ratio is applied to the input drive in order to produce a constant output speed of the output member 36.

The substantially constant gear ratio is achieved by selecting the gear ratios of the two drive paths to be opposite in terms of direction.and sufficiently different in ratio to achieve the requirement.

Figure 4:
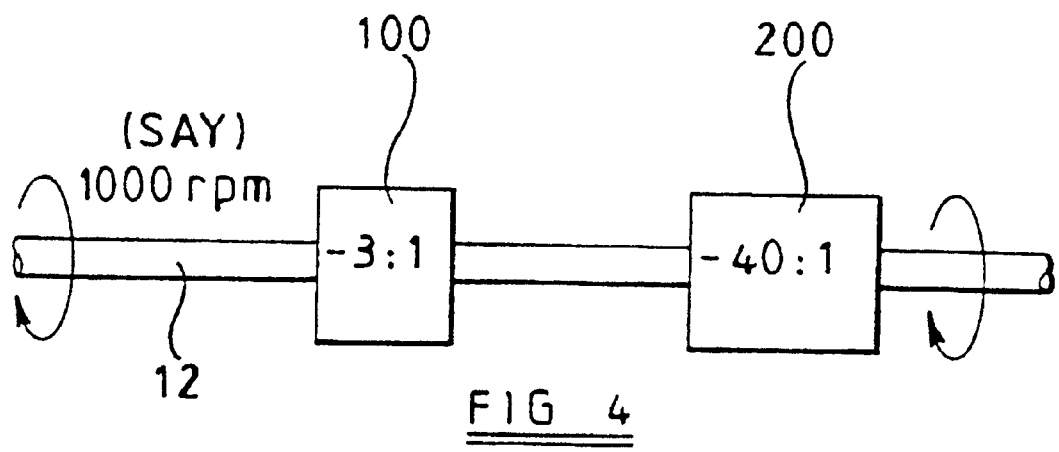
FIGS. 4 to 6 are diagrammatic representations of the effects of various parts of the actuator jamming.
Figure 5:
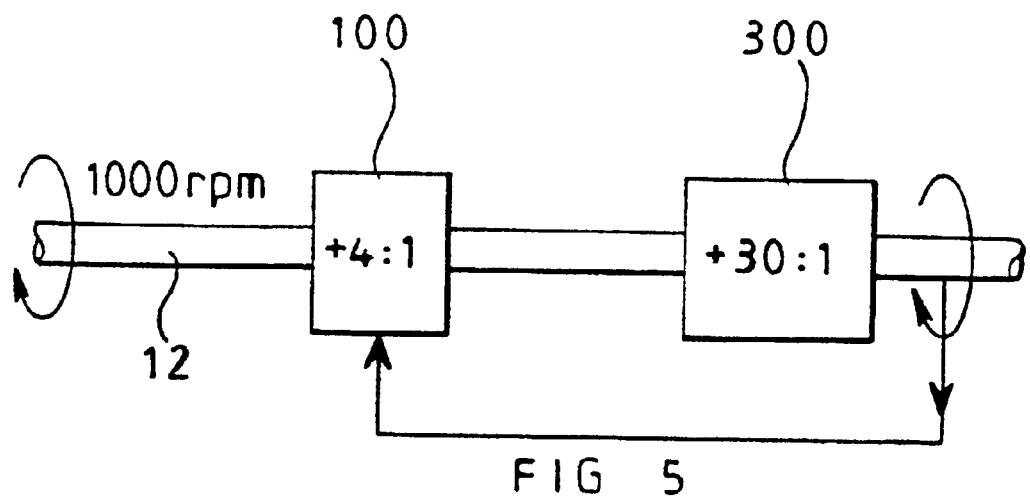

The description given above with regard to FIGS. 4 to 6 is a simplified view of the operation of the actuator. Each compound planetary epicyclic has a substantially different ratio to account for the different ratios of the input differential according to each particular drive path. One drive is chosen with a negative ratio and one with a positive ratio with the difference between the two being in proportion to that of the input differential along its two drive paths. These ratios are selected along with the input differential to give constant output speed with respect to the input speed regardless of the path taken within the device. In addition, high gear reductions from input to output are achievable. It will be appreciated that, instead of the compound planetary epicyclic gearing for the output drives of the primary and secondary drive paths, other gearing may be used. For example, simple epicyclic reduction gearing arranged in series, can be used.

As can be seen from the drawings the output member 36 rests on the secondary drive carrier member and therefore even if the output member does seize to the carrier member drive will still be transmitted to the output member.

If a jam does occur within the actuator and subsequently clears or partially clears the actuator will continue to operate with.an input to output ratio which remains substantially constant or unchanged.

What is claimed is:

1. A geared rotary actuator having:
   a differential gear unit having a drive input and first and second reduced outputs;
   an output driven member for connection to an external member to be driven by the actuator;
   said second drive path includes an output carrier for carrying the first drive path such that:
   a first drive path comprising a first balanced planetary configuration coupling said first output of the differential gear unit to said output driven member;
   a second drive path comprising a second balanced planetary configuration;
   and an output carrier carrying said first and second balanced planetary configurations;

wherein said second balanced planetary configuration couples said second output of the differential gear unit to said output driven member by way of said output carrier;

and wherein the arrangement is such that:

under normal conditions drive is transmitted from the input drive to the output driven member via said differential gear unit and said first drive path;

in response to jamming or binding of said first drive path said first drive path and said second drive path are caused to rotate en bloc thereby to transmit drive to said output, driven member via said differential gear unit and said second drive path;

and in response to jamming or binding of said differential gear unit, drive is transmitted to said output member via said differential gear unit and both said first and second drive paths;

the arrangement being further such that the gear ratio between said drive input and said output driven member remains substantially the same.

2. A geared rotary actuator according to claim 1 wherein said second drive path includes an output carrier for carrying the first drive path such that in response to jamming of said first drive path, said first drive path and said second drive path are caused to rotate en bloc thereby to transmit drive to the output driven member.

3. A geared rotary actuator according to claim 1 where one of said drive paths has a negative ratio and the other of said drive paths has a positive ratio, the difference in magnitude of said ratios being in proposition to that of the differential gear until along said drive paths.

4. A geared rotary actuator according to claim 3 wherein said first and second drive paths each comprises a balanced planetary configuration thereby to reduce the occurrence of skewing of the planetary gears under applied loading.

5. A geared rotary actuator according to claim 3 wherein said primary and secondary drive paths each comprises a balanced planetary configuration thereby to reduce the occurrence of skewing of the planetary gears under applied loading.

6. A geared rotary actuator according to claim 5 wherein the balanced planetary configuration includes a three planet/annulus gear assembly for each of the first and second drive paths.

7. A geared rotary actuator according to claim 5 wherein each assembly comprises end gear planet/annulus gears which gears are substantially identical so that the forces thereon are substantially balanced.

8. A geared rotary actuator according to claim 1 wherein said selected ratio is greater than 50:1.

9. A geared rotary actuator according to claim 1 wherein said selected ratio is greater than 200:1.

10. A geared rotary actuator according to claim 2 wherein said first and second drive paths each comprises a balanced planetary configuration thereby to reduce the occurrence of skewing of the planetary gears under applied loading.

* * * * *